United States Patent [19]

Jones

[11] Patent Number: 4,870,781

[45] Date of Patent: Oct. 3, 1989

[54] COMBINATION TREE SUPPORT AND FEEDER STAKE

[76] Inventor: Timothy D. Jones, 1202 Churchill Dr., Gastonia, N.C. 28054

[21] Appl. No.: 187,971

[22] Filed: Apr. 28, 1988

[51] Int. Cl.⁴ .................. A01G 17/06; A01G 29/00
[52] U.S. Cl. .................................... 47/43; 47/44; 47/48.5; 248/27.8
[58] Field of Search ............... 47/40.5, 42, 43, 48.5, 47/44, 47, 46, 45; 135/118; 52/148; 111/7.1–7.4; 248/27.8, 499, 508

[56] References Cited

U.S. PATENT DOCUMENTS

| | | | |
|---|---|---|---|
| D. 218,582 | 9/1970 | Kiester | 135/118 X |
| 1,268,459 | 6/1918 | Hjermstad | 135/118 X |
| 1,984,265 | 12/1934 | Hamer | 47/48.5 |
| 2,618,902 | 11/1952 | Prescott | 47/47 |
| 2,712,864 | 7/1955 | Clevett, Jr. | 135/118 X |
| 2,809,468 | 10/1957 | Eliot | 47/48.5 X |
| 2,931,140 | 4/1960 | Laffler et al. | 47/48.5 |
| 3,345,774 | 10/1967 | Delbuguet | 47/48.5 |
| 3,447,263 | 6/1969 | Johnson | 47/47 |
| 3,579,908 | 5/1971 | Morgan | 47/45 |
| 3,711,992 | 1/1973 | Martin | 47/48.5 |
| 3,875,699 | 4/1975 | Lamarre | 47/46 |
| 4,176,494 | 12/1979 | Boucher et al. | 47/47 |
| 4,249,342 | 2/1981 | Williams | 47/43 |
| 4,318,246 | 3/1982 | Jungbluth et al. | 47/42 |
| 4,745,706 | 5/1988 | Muza et al. | 47/48.5 X |

FOREIGN PATENT DOCUMENTS

| | | | |
|---|---|---|---|
| 0224149 | 9/1959 | Australia | 47/48.5 |
| 0139663 | 4/1903 | Fed. Rep. of Germany | 47/48.5 |
| 2034448 | 1/1972 | Fed. Rep. of Germany | 47/46 |
| 2573803 | 5/1986 | France | 47/47 |

Primary Examiner—Richard J. Johnson
Assistant Examiner—Jeffrey L. Thompson
Attorney, Agent, or Firm—Clifton Ted Hunt

[57] ABSTRACT

A combination tree support and feeder stake is provided for use in groups to simultaneously support and nourish transplanted trees. Each said stake includes a tapered and reinforced body portion formed from plastic with an anchoring unit to be attached to a transplanted tree and a hollow core to receive fertilizer which escapes through holes providing communication between the hollow core and the ground.

1 Claim, 2 Drawing Sheets

COMBINATION TREE SUPPORT AND FEEDER STAKE

FIELD OF THE INVENTION

This invention relates to the support and feeding of transplanted trees.

BACKGROUND OF THE INVENTION

It is common practice to provide support for trees after they are transplanted. Such support is generally provided by three or more stakes spaced equidistantly from each other and driven into the ground around the transplanted tree. Rubber covered wires or ropes are tied to the stakes and extend to the tree and tightened to hold the tree in a vertical position until its root structure develops sufficiently to support the tree.

It is also common practice to nourish the tree after transplanting by fertilizing the ground around each newly transplanted tree. This is generally accomplished either by driving fertilizer stakes into the ground in the area of each transplanted tree or sprinkling fertilizer around each tree.

To applicant's knowledge, the supporting of the tree and the fertilizing or nourishing of the tree have heretofore been accomplished as two separate and distinct steps, and nothing has been heretofore available to simultaneously perform the dual function of supporting and nourishing the tree.

SUMMARY OF THE INVENTION

The function of simultaneously supporting and nourishing is accomplished by providing a group of open topped hollow tree stakes which may be driven in the ground and tied in supporting relation to the tree. Each of the combination support and feeder stakes of this invention has a plurality of radially extending holes providing communication between the lower portion of the chamber within the hollow stake and the ground around the stake. After the stakes are driven in the ground the hollow stakes are filled with a suitable fertilizer. When the tree is watered, either by rain or by applying water through a sprinkling system, water is added to the fertilizer in the stakes. The water moves the fertilizer out of the chamber through the radially extending holes and into the ground to nourish the tree.

The stakes of this invention may be repeatedly filled with fertilizer to nourish the tree as desired, and may be reused to support and nourish different trees.

DETAILED DESCRIPTION OF THE INVENTION

Figure 1:
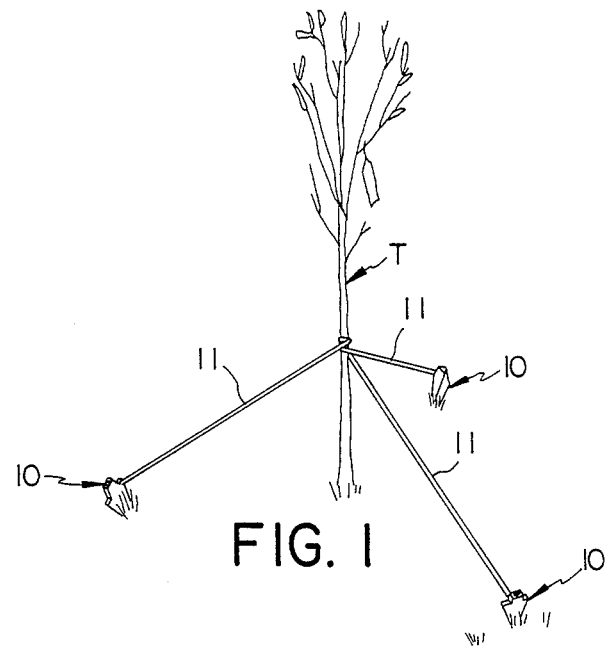
FIG. 1 is a perspective environmental view illustrating the conventional support arrangement for a transplanted tree but using the combination support and feeder stakes of this invention.

Referring more specifically to the drawings, a combination tree support and feeder stake is broadly indicated at 10. A group of stakes 10 are driven in the ground in equally spaced relation to each other about a newly transplanted tree T, as shown in FIG. 1. It is customary in the transplanting of trees with their roots packaged in a ball of dirt to dig a hole at the new site approximately twice the diameter of the ball of dirt on the transplanted tree. The stakes 10 of this invention are preferably placed within the circumference of the freshly dug hole after the tree has been positioned in the hole and the hole has been refilled with dirt. Each of the stakes 10 is then tied to the tree in the usual manner by a rubber covered wire or rope 11.

Each stake 10 is made from an elastomeric plastic that is strong enough to resist damage when struck with a sledge hammer to drive the stake in the ground. Polypropylene has been found to be a suitable plastic for the intended purpose but the stakes may be made from other plastic if desired. The stake is preferably made in two sizes for use with different sizes of trees. A stake 8½ inches long is suitable for use with trees up to one inch caliber and a stake 12 inches long is suitable for use with larger trees. The structure of the different sizes of stakes is the same, the only difference being in the length and corresponding cross sectional dimensions of the stakes.

The combination support and feeder stake of this invention comprises a body portion broadly indicated at 12 and including a squared head 13 at the top of the stake and a pointed end 14 at the bottom of the stake. Anchoring units 15 extend from two opposite sides of the squared top 13, a selected one of which is intended to receive the wire or rope 11 for tying the stake to the tree T. Oppositely directed flanges 16 extend laterally beneath the squared head 13 terminating in opposed faces 20. Opposed longitudinal flanges 18 are formed flush with the opposed faces 20 of the lateral flanges 16 and taper downwardly and inwardly to the bottom pointed end 14 of the stake 10.

Opposed ribs 21 extend laterally between the flanges 18 and taper downwardly and inwardly beneath the loops 15 to the pointed end 14 of the stake. The flanges 18 and ribs 21 strengthen the stake to withstand the pounding imposed upon it by driving it in the ground and to resist the strain imposed upon it by anchoring the tree.

Figure 3:
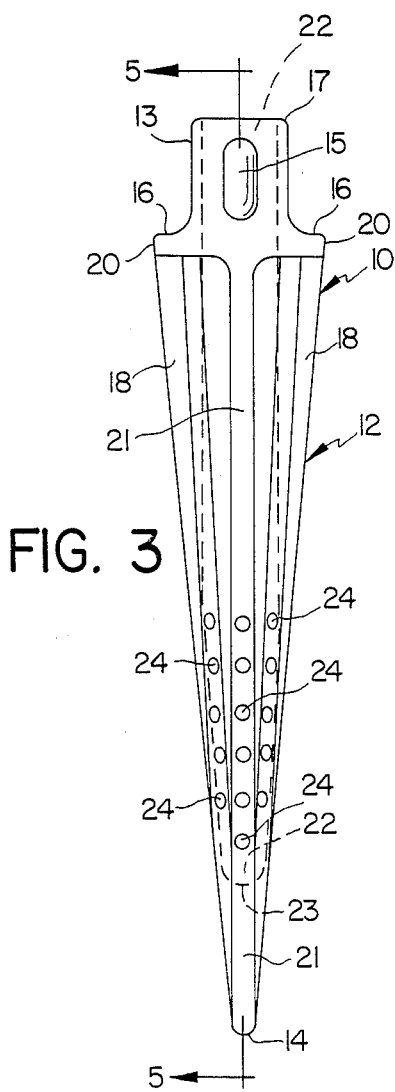
FIG. 3 is a side elevation looking at the left side of the stake in FIG. 2.
Figure 4:
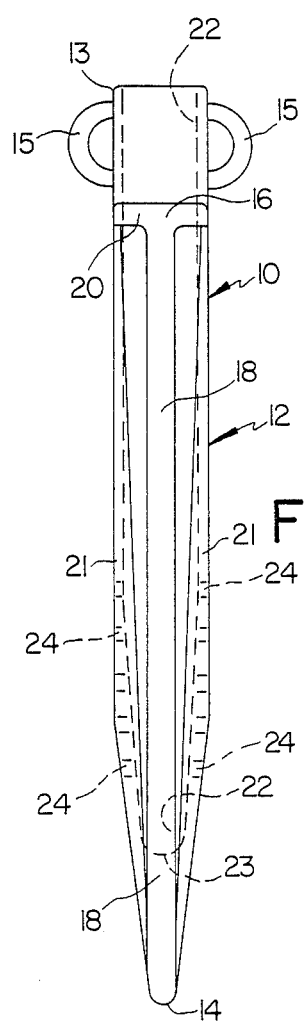
FIG. 4 is a side elevation looking at the right side of the stake in FIG. 2.
Figure 2:
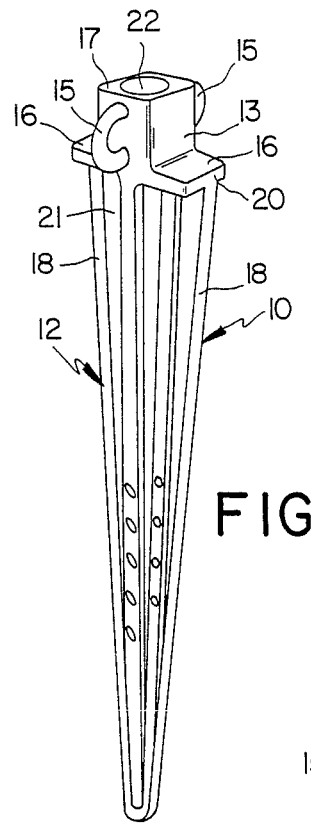
FIG. 2 is a perspective view of one of the stakes shown in FIG. 1 removed from the ground for the purpose of illustration.
Figure 5:
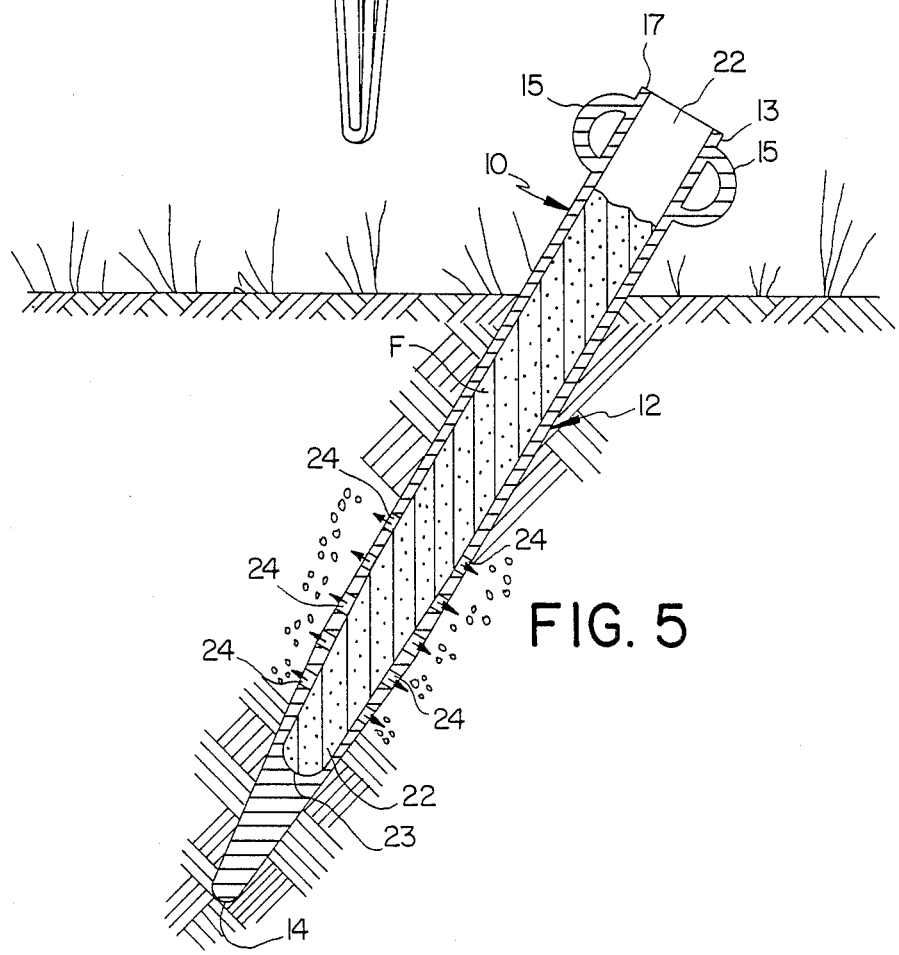
FIG. 5 is a modified sectional view taken substantially along the line 5—5 in FIG. 3 showing the stake driven in the ground to illustrate the tree supporting position of the stake and the release of fertilizer beneath the surface of the ground.

It will be noted that the loops 15 are between the flanges 18 and that the flanges 18 represent the widest portion of the stake as is seen by a comparison of the side elevations of the stake shown in FIGS. 3 and 4. When the stakes are positioned about a tree with one of the loops 15 extending toward the tree from each stake, the stakes may be driven in the ground at an angle such as indicated in FIG. 5, with the widest portion of the stake facing the tree to offer the greatest resistance to being dislodged when force is exerted by storms or otherwise on the wire or rope 11 connecting the tree to the stakes.

The body portion 12 has a circular bore or chamber 22 communicating with the atmosphere at the top of the stake and terminating at a point 23 spaced above the bottom 14 of the stake. The chamber 22 is provided for the reception of a fertilizer 23, preferably the powder type such as sold under the trademark STAYGREEN.

Alternatively, a liquid fertilizer or a granular fertilizer may be used.

The fertilizer is placed in the chamber 22 of the stake 10 after the stake has been driven in the ground and tied to the tree. Water enters the open top of the stake from rain or routine watering of the tree and accumulates within the chamber 22 to activate the fertilizer and move it from the chamber into the surrounding ground through holes 24 extending from the chamber 22 through the body portion 12 and providing communication between the chamber 22 and the ground surrounding the stake. The fertilizer may be replenished within the chamber 22 as often as desired.

The stakes may be removed from the ground after the transplanted tree T is self-supporting and the stakes 10 reused in the manner described to support and feed other transplanted trees.

Although specific terms have been used in describing the invention, they are used in a generic sense only and not for the purpose of limitation.

I claim:

1. A combination tree support and feeder stake comprising an elongated and tapered body portion, at least part of which is intended to be positioned in use beneath the surface of the ground, said body portion including an anchoring unit extending from one side of the body portion at an upper end portion thereof for attaching the stake to a tree, flanges and ribs extending laterally from the body portion and tapering downwardly and inwardly to the bottom of the stake for reinforcement, said ribs extending generally parallel to the anchoring unit, said flanges extending generally perpendicular to the ribs and having a greater cross-sectional dimension in the radial direction than the ribs, said body portion having an open top and an internal chamber communicating with the open top and located in use at least partially beneath the surface of the ground for the reception of fertilizer, and said body portion also having a plurality of openings providing communication between at least that portion of the internal chamber beneath the surface of the ground and the area surrounding the stake, whereby a tree may be supported and fed.

* * * * *